United States Patent Office 2,985,535
Patented May 23, 1961

2,985,535
SOLVENT OXIDATION OF LINOLEUM CEMENT
Alan K. Forsythe, Manor Township, Lancaster County, Pa., assignor to Armstrong Cork Company, Lancaster, Pa., a corporation of Pennsylvania
No Drawing. Filed Apr. 6, 1959, Ser. No. 804,090
5 Claims. (Cl. 106—123)

This invention relates generally to linoleum cement, and more particularly, to a linoleum cement containing a tall oil ester. Still more particularly, the invention relates to a process of preparing a linoleum cement from crude tall oil wherein the unsaponifiable materials in the crude tall oil are eliminated from the cement.

For many years linoleum cements have been made from a drying oil and a resin by a number of methods which result in the production of a siccative oil-resin gel by oxidizing and polymerizing the siccative oil, generally in the presence of the resin. Ordinarily linoleum cements comprise about 65% to about 85% drying oil and about 35% to about 15% by weight resin, usually rosin. Linseed oil has usually been the siccative oil of choice, but recently specially treated tall oils have made significant inroads in the amount of linseed oil normally used for linoleum manufacture.

U.S. Patent 2,752,262, Dunlap, issued June 26, 1956, describes the use of tall oil in linoleum cements. The Dunlap patent teaches the selective esterification of tall oil under controlled conditions with a polyhydric alcohol containing from 3–5 carbon atoms, such as glycerol and pentaerythritol. By such a procedure, only the fatty acids of the tall oil are esterified, while the rosin remains substantially unesterified. The esterification temperatures to be used are in the range of 180°–250° C. The resulting partially esterified tall oil produced by selective esterification of only the fatty acid content of the tall oil is then oxidized in the usual manner while admixed with linseed oil or other siccative fatty oil. The mixture generally contains 18% to about 50% by weight of the partially esterified tall oil. After the mixture has been oxidized in air or with oxygen, generally at a temperature in the range of about 160°–240° F., the resulting oxidized and polymerized gel is used in customary manner to form a linoleum composition.

U.S. Patent 2,815,295, Forsythe, issued December 3, 1957, teaches the formation of a linoleum cement which contains no siccative fatty oil other than esterified fatty acids, preferably tall oil fatty acids. The Forsythe composition to be oxidized may be obtained by admixing esterified tall oil fatty acids with rosin, or it may be obtained by partially esterifying crude tall oil enriched by the addition of fatty acids. In any case, the resulting oxidized and polymerized gel is utilized to make a linoleum composition in the normal manner.

Whenever tall oil is esterified and then converted into linoleum cement, all of the tall oil constituents remain in the cement. Since a considerable portion of crude tall oil is unsaponifiable along with some saturated and mono-unsaturated fatty acids, this portion passes into the final linoleum cement substantially unchanged and consequently lowers the quality of the cement by diluting it and by increasing its thermoplasticity. Accordingly, it is desirable to have available a process which starts with crude tall oil and which, in a straightforward and inexpensive manner, will produce an oxidized and polymerized gel which is free from the deleterious effects caused by the presence of unsaponifiables and other nonreactive materials found in crude tall oil.

It is the primary object of the present invention to present such a process. It is a further object of the present invention to present a process for oxidizing selectively esterified crude tall oil while simultaneously eliminating from the resulting cement those materials which dilute and weaken the final cement.

These objects are accomplished in a straightforward and effective manner. The invention contemplates the oxidation of a partially esterified tall oil produced by selective esterification of only the fatty acid content of crude tall oil with a polyhydric alcohol containing 3–5 carbon atoms. The oxidation step is carried out by dissolving the partially esterified crude tall oil in an aliphatic hydrocarbon solvent therefor having a boiling point falling within the range of about 88° F. to 460° F. The solution is maintained at an oxidation temperature in the range of about 160°–240° F. Oxygen, as such or in air, is passed through the solution maintained at the oxidation temperature range in order to oxidize and polymerize the partially esterified tall oil. The oxidized tall oil fatty acid esters precipitate from the solution in the form of a gel as they are formed. The gel is then recovered and utilized as a linoleum cement.

The partially esterified tall oil to be used in the process of the present invention is that disclosed in either the above-described Dunlap or the above-described Forsythe patents. The partially esterified crude tall oil may be used alone or in admixture with linseed oil in an amount of about 18% by weight partially esterified crude tall oil on up. Thus the mixture to be oxidized by the process of the present invention will always contain at least about 18% by weight partially esterified crude tall oil and may contain 100% by weight of the partially esterified crude tall oil. The partially esterified crude tall oil itself may be prepared by the processes described in the aforesaid Dunlap and Forsythe patents. The rosin acid number of the mixture to be oxidized will be in the range 30–50.

In the present process the partially esterified crude tall oil, with or without linseed oil, is dissolved in a solvent which is a poor solvent for the gel which results from oxidation of the partially esterified tall oil, which solvent must also be inert to oxidation. The solvent must be an aliphatic solvent, since aromatic solvents dissolve or seriously swell the final gel. Additionally, the solvent or solvent mixture must have a boiling point such that the requisite oxidation temperature may be conveniently maintained. It has been found that the aliphatic hydrocarbon solvent should have a boiling point which occurs in the range of about 88° F. to 460° F. Aliphatic hydrocarbon solvents boiling lower than about 88° F. present a difficult problem of reflux during the oxidation step. Aliphatic hydrocarbon solvents boiling above about 460° F. are too difficult to remove from the final gel. The solvent may be such aliphatic hydrocarbons as hexane, octane, or an aliphatic grade of mineral spirits.

The weight ratio of solvent:oil should be in the range of 1:3 to 10:1. Solvent:esterified tall oil weight ratios outside of these limits are generally unsatisfactory. Where too little solvent is used, the unsaponifiables, which normally are soluble in the solvent, will precipitate along with the gel. Where too much solvent is used, the very slight solubility of the gel in the solvent will nevertheless produce undue losses of the useful gel in the solvent. It is preferred that the solvent:esterified crude tall oil weight ratio be about 1:1.

The esterified crude tall oil is taken up in the requisite amount of solvent, and it will be found that the entire mass of partially esterified crude tall oil is soluble in the solvent at the oxidation temperature. The solution is then maintained at the requisite temperature in the range of about 160°–240° F. in a vessel equipped with reflux apparatus. A current of oxygen, or air, or oxygen-enriched air is then passed through the solution with agitation. As the partially esterified crude tall oil is oxidized and polymerized, the resulting gel precipitates from the solution and collects on the interior surfaces of the vessel. The end point of the oxidation is easily recognized by the production of a stiff gel. Alternatively, the oxidation period is conducted until no further significant precipitation takes place from the solution. On completion of the oxidation the solvent contains most of the unsaponifiables, the saturated fatty acids, and the monounsaturated fatty acids which detract from the properties of a good linoleum cement. The solution is then drained off and flashed or otherwise distilled to recover the pure solvent as such. The gel is pressed and dried, or otherwise treated, to eliminate all of the solvent therefrom. If desired, residual solvent may be removed by thoroughly washing the gelled product with petroleum ether and then drying the washed gel in a vacuum oven. The dried gel is the desired linoleum cement. The cement may be compounded with conventional fillers such as cork, wood flour, and the like, and various pigments to produce very desirable linoleum compositions. A typical linoleum composition is as follows:

| Ingredients: | Parts by weight |
|---|---|
| Wood flour | 73 |
| Whiting | 117 |
| Cement | 112 |

Linoleum sheets prepared by use of the linoleum cements of the present process are lighter in color and considerably less tacky than sheets prepared from the cements of the prior art.

The following examples illustrate several specific embodiments of the invention. All parts are by weight unless otherwise stated.

*Example 1*

Into a flask is placed 600 parts of crude tall oil having a fatty acid number of 70 and a total acid number of 166. The oil was heated to a temperature of 150° C. at which point was added 30 parts pentaerythritol. The mixture was heated to 200° C. At the end of 10 hours at 200° C. the total acid number was 95, and the rosin acid number was 89, indicating that all but an insignificant amount of the fatty acids was esterified and that all but an insignificant amount of rosin acids was not esterified.

To 125 parts of the above-described partially esterified crude tall oil was added 125 parts linseed oil. To the mixture was added 250 parts of an aliphatic hydrocarbon solvent fraction boiling in the range 352–389° F. (Shell Sol 71). The mixture was agitated to dissolve the oils in the solvent, and there was then added ten parts of a drier solution containing 14.4% lead and 0.025% manganese. The temperature of the mixture was maintained at 180° F. and air was bubbled through the mixture at that temperature for 2500 minutes. Vigorous agitation was maintained.

The gel adhering to the sides of the container was scraped out, squeezed to remove excess solvent, and dried in a vacuum oven.

When the resulting cement was formed into a linoleum sheet in accordance with the usual methods, the resulting sheet was lighter in color and possessed less thermoplasticity than a sheet made from a gel oxidized by prior methods.

The above run was repeated save that the solvent used had a boiling point in the range of 424–460° F. (Soltrol 170). The oxidation temperature was 180° F. and the period of time of oxidation was 1479 minutes.

A linoleum sheet prepared from the resulting cement was lighter in color, stronger, and less tacky than the control prepared by prior processes.

*Example 2*

Into a container is placed 250 parts of the partially esterified tall oil prepared as described in Example 1. To the oil is added 250 parts of petroleum ether boiling in the range 88°–138° F. The usual drier was added.

Oxidation with air was carried out at reflux temperature, about 130° F. for a period of time of 2000 minutes. Some difficulty was encountered with solvent loss. The resulting gel was removed from the container, thoroughly washed with petroleum ether, and dried in a vacuum oven maintained at 122° F.

A linoleum sheet prepared from this cement was superior in color and thermoplasticity to the normal linoleum sheet prepared by prior processes.

*Example 3*

Example 2 was repeated save that the solvent used had a boiling point in the range 305°–400° F. (Atlantic Naphthol #57); no difficulty with solvent loss was experienced. Oxidation time was 2000 minutes at 180° F.

A linoleum sheet, superior in color and plasticity to sheets prepared by prior processes, was made from the resulting gel.

I claim:

1. The method of oxidizing a partially esterified crude tall oil produced by selective esterification of only the fatty acid content of tall oil with a polyhydric alcohol containing 3–5 carbon atoms which comprises dissolving said partially esterified crude tall oil in an aliphatic hydrocarbon solvent therefor having a boiling point falling within the range of about 88° to 460° F. to form a solution having a solvent:esterified tall oil weight ratio in the range of 1:3 to 10:1, maintaining said solution at a temperature in the range of about 160°–240° F., passing oxygen through said solution to precipitate from said solution in the form of a gel oxidized tall oil fatty esters, and recovering said gel.

2. The method according to claim 1 wherein said ratio is about 1:1.

3. The method according to claim 1 wherein said partially esterified crude tall oil is oxidized in the presence of about 0–82% by weight linseed oil based on the weight of the mixture of linseed oil and partially esterified crude tall oil.

4. The method according to claim 1 wherein said solution is maintained at a temperature of about 180° F.

5. A method according to claim 1 wherein said oxygen is in the form of air.

References Cited in the file of this patent

UNITED STATES PATENTS

| 2,565,484 | Dunlap et al. | Aug. 28, 1951 |
| 2,752,262 | Dunlap et al. | June 26, 1956 |